United States Patent

Startup et al.

[11] Patent Number: 6,144,704
[45] Date of Patent: Nov. 7, 2000

[54] PHASE DOMAIN MULTIPLEXED COMMUNICATIONS SYSTEM

[75] Inventors: James William Startup; Ruby Figor Hutchins, both of Chandler, Ariz.

[73] Assignee: Motorola, Inc., Schaumburg, Ill.

[21] Appl. No.: 09/128,427

[22] Filed: Aug. 4, 1998

[51] Int. Cl.$^7$ .............................. H04K 1/10; H04L 27/28
[52] U.S. Cl. ......................................................... 375/260
[58] Field of Search ................................. 375/259, 260, 375/285, 254, 295, 296, 316, 346, 347, 348, 349, 350, 377; 370/300, 302, 482, 203, 208

[56] References Cited

U.S. PATENT DOCUMENTS

| | | |
|---|---|---|
| 3,743,775 | 7/1973 | Hutchinson et al. . |
| 5,019,793 | 5/1991 | McNab . |
| 5,083,097 | 1/1992 | Bolie . |
| 5,177,455 | 1/1993 | Bennett . |
| 5,504,783 | 4/1996 | Tomisato et al. ...................... 375/267 |
| 5,519,692 | 5/1996 | Hershey et al. ........................ 370/18 |
| 5,563,906 | 10/1996 | Hershey et al. ...................... 375/200 |

FOREIGN PATENT DOCUMENTS 9941871  8/1999  WIPO .............................. H04L 1/04

*Primary Examiner*—Chi H. Pham
*Assistant Examiner*—Jean B. Corrielus
*Attorney, Agent, or Firm*—Dana B. LeMoine; Frank J. Bogacz

[57] ABSTRACT

A phase domain multiplexed communication system generates N carrier frequencies each with a unique phase according to a selected orthogonal vector containing N elements. A subscriber information signal is first divided through a signal divider (215, FIG. 6). Each divided signal is then upconverted through a mixer (220) and phase shifted according to the selected orthogonal vector. The resulting signal is then combined through a summing element (250) and transmitted. At a receiver, the incoming signal is coupled to a signal divider (315, FIG. 7) where the signal is divided into N signal components. Each signal component is downconverted and phase shifted so that the transmitted subscriber information can be extracted at a summing element (350). At the summing element (350) the desired subscriber signal components add in-phase while the signal components corresponding to other subscribers add out-of-phase.

9 Claims, 5 Drawing Sheets

PHASE DOMAIN MULTIPLEXED COMMUNICATIONS SYSTEM

FIELD OF THE INVENTION

The invention relates generally to communication systems and, more particularly, to communication systems which employ multiple access techniques.

BACKGROUND OF THE INVENTION

In a communications system which employs multiple access techniques such as frequency domain or code division multiplexing, several subscribers make use of a single communications resource. For example, in a frequency division multiplexed system, each subscriber unit is assigned a particular frequency for use while that subscriber is engaged in a call with another, similarly equipped, subscriber unit. When the subscriber has completed transmissions, the frequency resource can be reassigned for use by another subscriber. However, in a typical frequency domain system, a limited number of frequency channels are available for use by subscribers. When this capacity limit has been reached, the communication system cannot accommodate additional subscribers.

A code division multiplexed system has an advantage over a frequency domain system in that the code division multiplexed system embodies a more efficient use of the frequency spectrum allocated for the communication system. In a code division multiplexed system, each subscriber unit is assigned a unique pseudonoise code while that subscriber unit is engaged in a call. Each subscriber unit makes use of the same frequency spectrum as other subscriber units, but is assigned a different pseudonoise code. However, in a code division multiplexed system, elaborate hardware must be employed in order to acquire and track the pseudonoise codes used by the various subscriber units. Additionally, in order for the communication system to be available to a large number of subscriber units, a rigid timing structure must be used in order to synchronize the code generator of a transmitting station with the code generator of a receiving station. This additional overhead reduces the flexibility of the system as well as increases the costs associated with operating the communication system.

Therefore, what is needed are a method and apparatus for achieving spectrally efficient communications without requiring the strict timing structure required in a code division multiplexed system.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DESCRIPTION OF THE PREFERRED EMBODIMENTS

A method and apparatus for a phase domain multiplexed communication system allows multiple subscriber units to share a common frequency resource without requiring strict timing between the transmitting and receiving station. Additionally, since pseudonoise codes are not used in the system, the necessary hardware required to track and correlate the pseudonoise codes in use by the system can be eliminated. The phase domain multiplexed communication system provides many of the advantages of a code division multiplexed system but does not require complex and elaborate hardware as that of a conventional code division multiplexed communication system.

Figure 1:
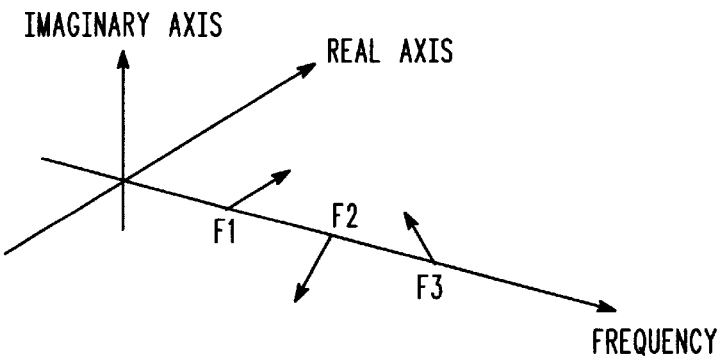
FIG. 1 illustrates a phasor diagram of a three element orthogonal vector space in accordance with a preferred embodiment of the invention.

FIG. 1 illustrates a phasor diagram of a three element orthogonal vector space in accordance with a preferred embodiment of the invention. In FIG. 1, frequency components $F_1$ through $F_3$ represent discrete frequencies each having a relative phase progressively shifted from the previous phase. Each frequency phasor rotates about the frequency axis as a function of time and takes on real and imaginary values as this rotation progresses. Therefore, as an example, $F_1$ has a relative phase of 0, while $F_2$ has a relative phase of $2\pi/3$ radians. Similarly, $F_3$ has a relative phase of $4\pi/3$ radians. Although each carrier phase changes with time, the relative difference between the initial phase of the carriers can always be determined. Additionally, while this example illustrates a three carrier phase domain multiplexed system, the concept is extendable to systems which make use of any number of carriers. In a preferred embodiment, the only limitation is that the number of carriers should equal the number of orthogonal phases used in the system.

Figure 2:
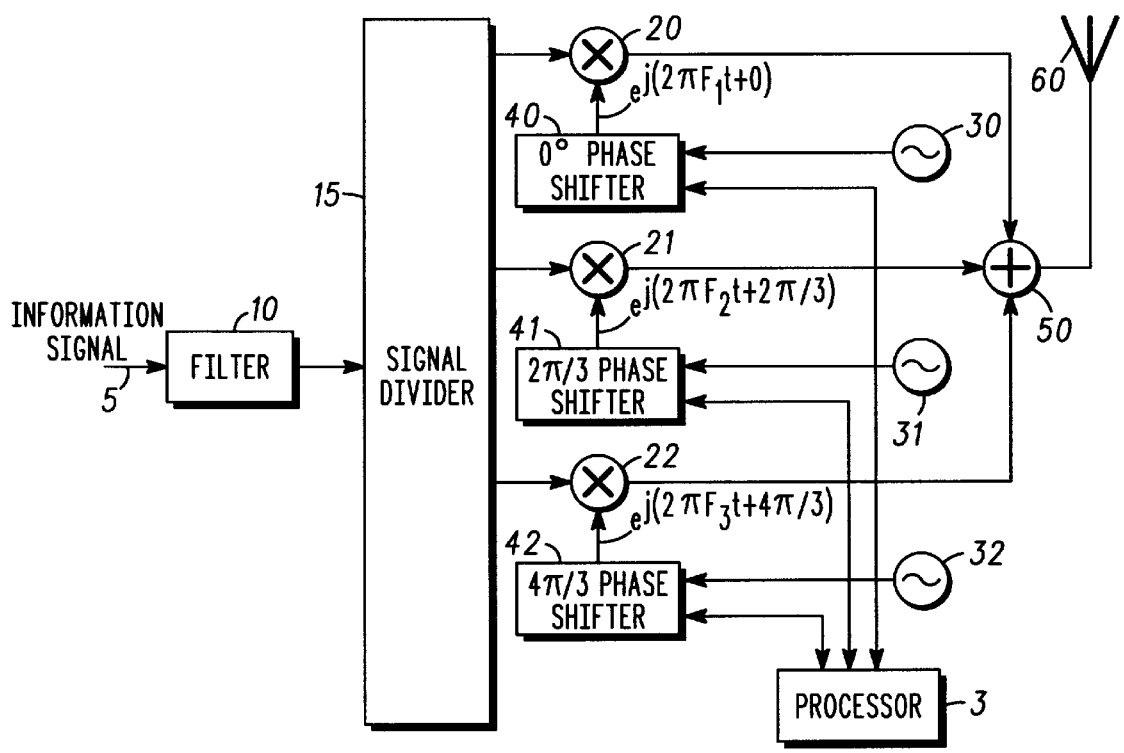
FIG. 2 illustrates a block diagram of a three carrier phase domain multiplexed transmitter in accordance with a preferred embodiment of the invention.

FIG. 2 illustrates a block diagram of a three carrier phase domain multiplexed transmitter in accordance with a preferred embodiment of the invention. The phase domain multiplexed transmitter of FIG. 2 is preferably a communications device such as a subscriber unit in communication with a satellite or other communications node. In FIG. 2, processor 3 selects an orthogonal vector in a vector space comprising three elements with each element specifying a phase shift. By way of example, and not by limitation, the orthogonal vectors of 0, 2π/3, and 4π/3 degrees are selected. Other possible orthogonal vectors which can be selected by processor 3 (for use by another subscriber, for example) include 0,−2π/3, and −4π/3 degrees, and, 0, 0, and 0 degrees. One of these other orthogonal vectors may be selected by a second communications device using the communications system.

Processor 3 conveys these phase shifts to phase shift elements 40, 41, and 42, which are discussed below. In this example, three carriers are used as well as a three element vector space. However, according to the requirements of the specific application, more or less carriers and vector space elements may be used. The use of three carriers would support three separate subscriber units.

In FIG. 2, information signal 5 is incident on filter 10. Information signal 5 can convey analog or digital information as appropriate for use in the communication system. Therefore, information signal 5 may comprise digital data, digitized voice, facsimile data, or other binary information. Additionally, information signal 5 may also convey analog speech, video, or other type of information.

Information signal 5 is input to filter 10, where it is filtered according to conventional techniques. In a preferred embodiment, filter 10 implements a root raised cosine response. The root raised cosine is desirable since it provides low inter-symbol interference. Other filtering responses, such as a Gaussian filter response, may be used as required by the particular application. Filter 10 is coupled to signal divider 15. Signal divider 15 functions to divide the information signal into three substantially equal signal components. In other applications where more or less carrier signals are desired, signal divider 15 divides the signal from filter 10 in accordance with the number of carrier signals.

At the outputs of signal divider 15, each signal component is input to one of mixers 20–22. Mixers 20–22 can be any suitable mixer for use at conventional communications frequencies as known to those skilled in the art. Signal generators 30–32 are also coupled to mixers 20–22 through phase shift elements 40–42. In a preferred embodiment, each of signal generators 30–32 generates a carrier signal arranged at substantially periodic intervals in a frequency domain. Each signal generator 30–32 need only be separated by an amount substantially equal to the reciprocal of the data rate of information signal 5. Thus, for example, in a three carrier phase domain multiplexed communication system, signal generator 30 may operate at 100 MHz. Meanwhile signal generators 31, and 32 operate at 101, and 102, MHz, respectively. Given a separation of 1 MHz, the maximum data rate of information signal 5 would be 500 Kbit/sec.

Each of signal generators 30–32 is coupled to one of phases shift elements 40–42. Each phase shift element 40–42, in response to the orthogonal vector selected by processor 3 for use by the particular subscriber unit, provides a unique phase shift. In this example, phase shift element 40 provides zero phase shift. Phase shift element 41 provides a 2π/3 phase shift. Phase shift element 42 provides a 4π/3 radian phase shift. In this manner each phase is progressively shifted by a constant amount. Processor 3 may select other orthogonal phase shifts in order to be used by other subscribers of the phase domain multiplexed communication system.

Mixers 20–22 perform the mixing process on the signal components from signal divider 15 using the outputs of phase shift elements 40–42. Thus, each signal component is converted to one of three carrier frequencies each with a unique phase shift. The mixing process serves to impress the information included in the signal components and upconvert the signal components to a carrier frequency. In this example, the output of phase shift element 40 can be expressed as $e^{j(2\pi F_1 T+0)}$. The output of phase shift element 41 can be expressed as $e^{j(2\pi F_2 T+2\pi/3)}$. The output of phase shift element 42 can be expressed as $e^{j(2\pi F_3 T+4\pi/3)}$. Each of these phase shifted carrier signals is conveyed to summing element 50. In a preferred embodiment, summing element 50 is a voltage summing device well known to those skilled in the art. For this example, the three phase shifted carrier signals are summed and conveyed to transmit antenna 60.

Antenna 60 can be of any type or construction such as a dipole, monopole above a ground plane, patch, or any element which transmits an electromagnetic wave as a function of the electrical current present on the surface of a radiating element. In an alternative embodiment, antenna 60 is of the aperture type such as a waveguide slot, horn, or any type of element which receives an electromagnetic wave as a function of the electric field present within an aperture. Antenna 60 desirably provides the necessary gain which allows the radiated signal which includes the plurality of frequencies ($F_1$–$F_3$) generated by the three carrier phase domain multiplexed transmitter to be conveyed across a communications channel.

Figure 3:
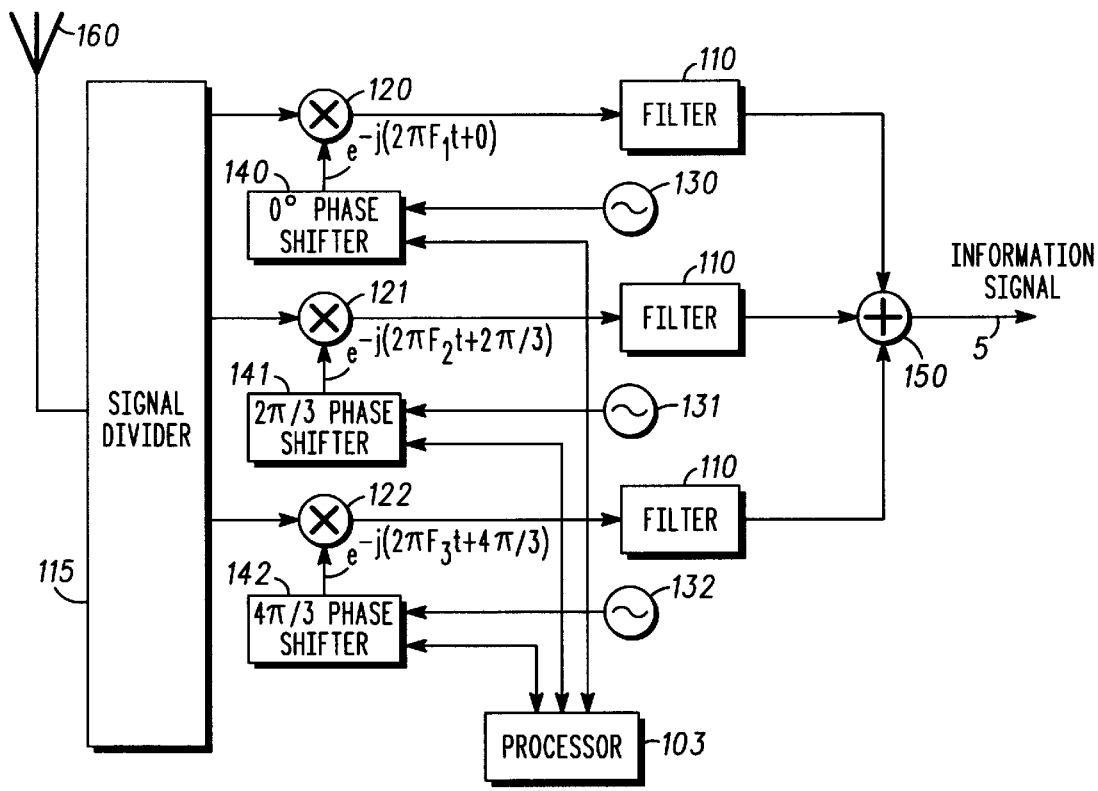
FIG. 3 illustrates a block diagram of a three carrier phase domain multiplexed receiver in accordance with a preferred embodiment of the invention.

FIG. 3 illustrates a block diagram of a three carrier phase domain multiplexed receiver in accordance with a preferred embodiment of the invention. In FIG. 3, a phase domain multiplexed signal, such as that broadcast by the three carrier phase domain multiplexed transmitter of FIG. 2, is received through antenna 160. Antenna 160 can possess characteristics similar to antenna 60. The received signal from antenna 160 is conveyed to signal divider 115 which divides the signal into three signal components.

FIG. 3, processor 103 desirably selects the identical orthogonal vectors used by processor 3 of the three carrier phase domain multiplexed transmitter of FIG. 2. Each phase shift selected by processor 103 is conveyed to phase shift elements 140–142 in a manner similar to that used by processor 3 to control phase shift elements 40–42. Also coupled to phase shift elements 140–142, are signal generators 130–132. Each of signal generators 130–132 generates signals in a frequency domain substantially identical to those frequencies generated by signal generators 30–32 of FIG. 2. The outputs of each signal generator are progressively phase shifted by one of phase shift elements 140–142 and conveyed to one of mixers 120–122.

In the mixing process, each of the signal components from signal divider 115 is multiplied by the reciprocal of the outputs of phase shift elements 40–42 of FIG. 2. Thus, the output of phase shift elements 140, 141, and 142, can be expressed as $e^{-j(2\pi F_1 T+0)}$, $e^{-j(2\pi F_2 T+2\pi/3)}$, and $e^{-j(2\pi F_3 T+4\pi/3)}$, respectively.

In a preferred embodiment, the output of mixers 120–122 represent down converted signal components. These signal components are input to filter 110 in order to remove any unwanted signal components which result from the nonlinear mixing process. Each output of filter 110 is coupled to summing element 150. In a preferred embodiment, summing element 150 is a voltage summing device similar to summing element 50 of FIG. 2. At the output of summing element 150 the original information signal can then be recovered without additional processing.

Figure 4:
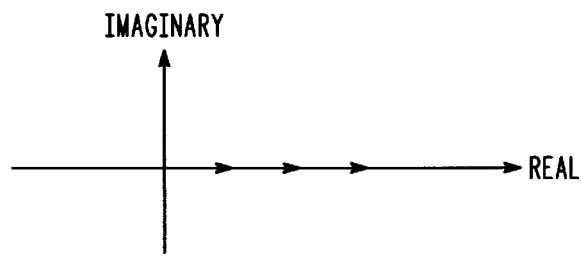
FIG. 4 illustrates a phasor diagram of the outputs of a summing element in accordance with a preferred embodiment of the invention.

FIG. 4 illustrates a phasor diagram of the outputs of a summing element (such as summing element 150 of FIG. 3) in accordance with a preferred embodiment of the invention. As described with reference to FIG. 3, the mixing and phase shifting processes performed by phase shift elements 140–142 and mixers 120–122 represent the multiplication of a received signal by the reciprocal of the function used to generate the transmitted signal. Thus, each of the three signal components combine constructively, as shown FIG. 4. To illustrate this, the following calculations are provided as an example for the three carrier phase domain multiplexed transmitter and receiver of FIGS. 2 and 3, respectively.

Signal Component #1: $e^{j(2\pi F_1 T+0)} \times e^{-j(2\pi F_1 T+0)} = 1$

Signal Component #2: $e^{j(2\pi F_2 T+2\pi/3)} \times e^{-j(2\pi F_2 T+2\pi/3)} = 1$ Signal Component #3: $e^{j(2\pi F_3 T+4\pi/3)} \times e^{-j(2\pi F_3 T+4\pi/3)} = 1$ When these components are summed, a maximum demodulated signal results on the real axis of FIG. 4.

Figure 5:
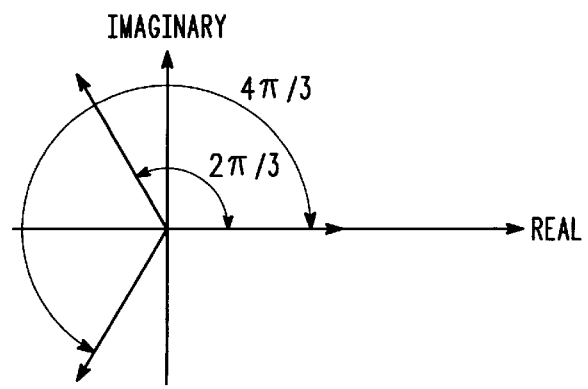
FIG. 5 illustrates a phasor diagram which shows the phasors resulting from using a vector orthogonal to that used in the example of FIG. 3.

FIG. 5 illustrates a phasor diagram which shows the phasors resulting from using a vector orthogonal to that used in the example of FIG. 3. As shown in FIG. 5, the orthogonal signals received by a three carrier phase domain multiplexed receiver of FIG. 3 produce a zero sum. To illustrate this, the following calculations are provided for the example three carrier phase domain multiplexed transmitter and receiver of FIGS. 2 and 3, respectively.

Signal Component #1: $e^{j(2\pi F_1 T+0)} \times e^{-j(2\pi F_1 T+0)} = 1$

Signal Component #2: $e^{j(2\pi F_2 T+2\pi/3)} \times e^{-j(2\pi F_2 T-2\pi/3)} = -\frac{1}{2} - \sqrt{3}/2$ Signal Component #3: $e^{j(2\pi F_3 T+4\pi/3)} \times e^{-j(2\pi F_3 T-4\pi/3)} = -\frac{1}{2} + \sqrt{3}/2$ When these components are summed, a zero sum results on the real axis of FIG. 5. Similar results are obtained when the incoming signal of the three carrier phase domain multiplexed transmitter of FIG. 2 are demodulated by the three carrier phase domain multiplexed receiver using phases of 0, 0, and 0 in phase shift elements 140–142 of FIG. 3.

Figure 6:
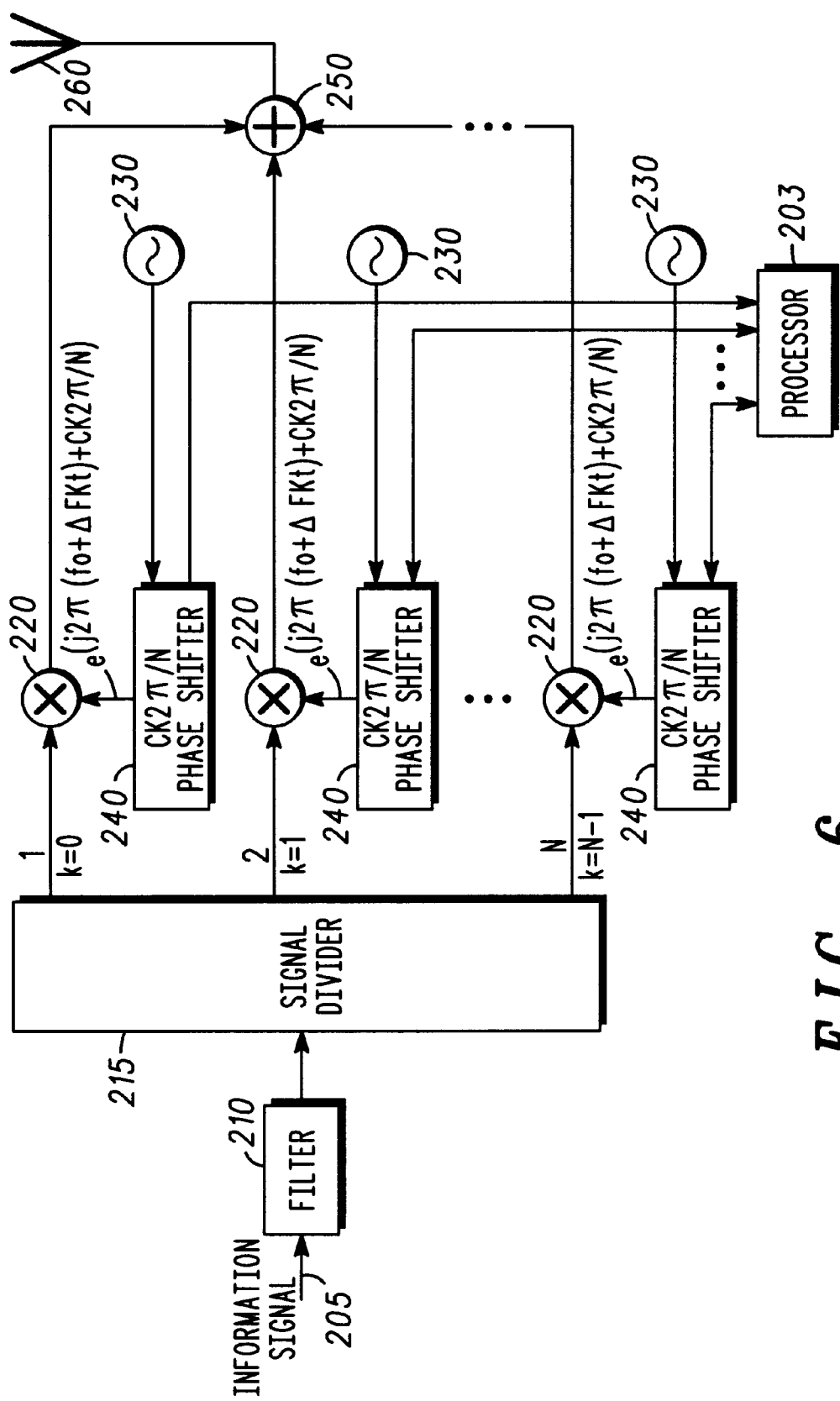
FIG. 6 illustrates a block diagram of an N carrier phases domain multiplexed transmitter in accordance with a preferred embodiment of the invention.

FIG. 6 illustrates a block diagram of an N carrier phase domain multiplexed transmitter in accordance with a preferred embodiment of the invention. The operations performed by the elements of FIG. 6 are similar to those performed by the corresponding elements of the three carrier phase domain multiplexed transmitter of FIG. 2. In a preferred embodiment, N is the number of subscriber units which can make use of the phase domain multiplexed communication system. N preferably varies from two to several dozen subscribers, although the present invention is not limited to this number of subscriber units.

In FIG. 6, information signal 205 is first incident on filter 210. Filter 210 performs root raised cosine or other Filtering as required by the particular application. The filtered information signal is incident on signal divider 215 which divides the signal into N number of signal components. Each of the N signal components is incident on one of the N number of mixers 220.

The N signal generators 230 generate carrier frequencies arranged at substantially periodic intervals in a frequency domain. The output of each of the N signal generators 230 is input to a corresponding one of the N phase shift elements 240. Each of phase shift elements 240 shifts the output of signal generators 230 according to the orthogonal vector selected by processor 203. In a preferred embodiment, orthogonal vectors are selected such that: $\emptyset_{L,i} = i \cdot L \cdot 2\pi/N$, where L is the index to the channel frequency, and $0 \leq L < N$, and, $\emptyset_I$ is the orthogonal vector, and $0 \leq i < N$. It should be pointed out that if $F(\Phi) = e^{j\Phi}$, then $F^T F = CI$, where "$F^T$" denotes the transpose of the matrix "F", "c" denotes a constant, and "I" denotes the identity matrix.

For the generalized transmitter of FIG. 6, phase shift: element 240 shifts the phase of the incoming signal from each of signal generators by an amount equal to $CK2\pi/N$ where K denotes an index which assumes values of 0 to N−1 and C denotes a constant which specifies the phase progression from 0 to $2\pi$ radians. The output of each phase shift element 240 can be expressed as $e^{j(2\pi(F_o+\Delta FK)t+CK2\pi/N)}$ for the each of the N mixer elements with Fo denoting the starting frequency and $\Delta FK$ denoting the frequency offset of each carrier frequency. The information from each of the N signal components is impressed on the output of each phase shift element 240 by way of mixers 220, and upconverted. Each of the N information bearing carrier signals is combined in summing element 250 and transmitted through antenna 260.

Figure 7:
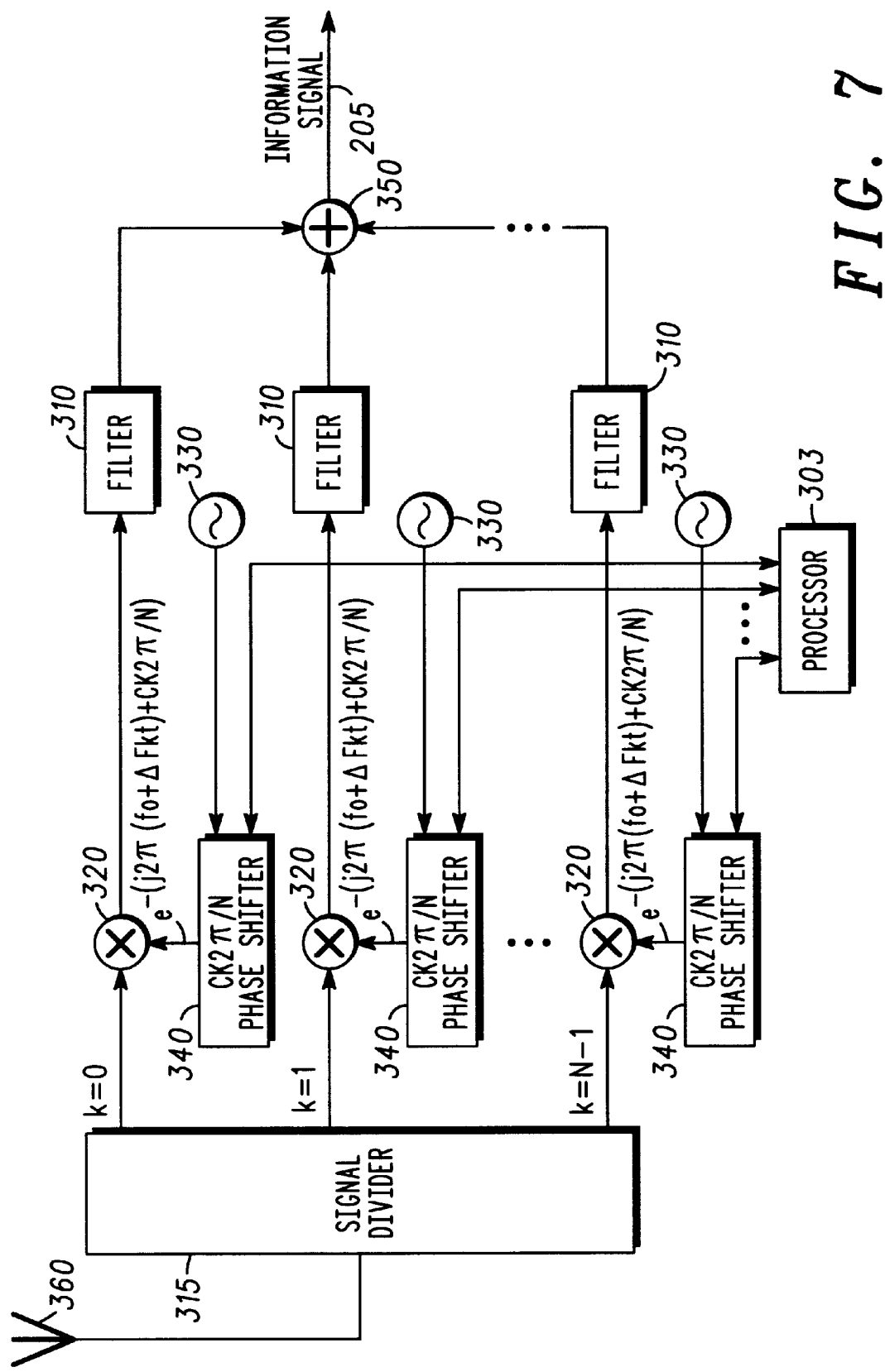
FIG. 7 illustrates a block diagram of a receiver for an N carrier phase domain multiplexed receiver in accordance with a preferred embodiment of the invention.

FIG. 7 illustrates a block diagram of a receiver for an N carrier phase domain multiplexed receiver in accordance with a preferred embodiment of the invention. The operations performed by the elements of FIG. 7 are substantially identical to those performed by corresponding elements of FIG. 3. In FIG. 7, a phase domain multiplexed signal comprising N carrier frequencies is first received through antenna 360. The signal from antenna 360 is conveyed to signal divider 315 where it is divided into N elements. Each output from signal divider 315 is coupled to one of N mixers 320.

Signal generators 330 each generate a carrier signal at substantially periodic intervals in a frequency domain. These signals are conveyed to one of the N phase shift elements 340. The individual phase shifts of the N phase shift elements 340 are controlled through commands from processor 303 according to the particular orthogonal vector selected for demodulating the phase domain multiplexed signal. The outputs of each of phase shift elements 340 are conveyed to one of N mixer 320 and output to one of N filters 310. Filters 310 remove any unwanted signal components created by the nonlinear mixing process performed by the N mixer 320. The signals are summed through summing element 350 where the content of information signal 205 can be recovered.

Figure 8:
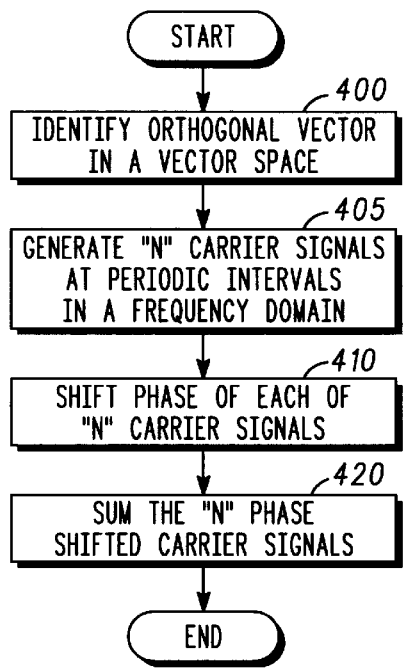
FIG. 8 illustrates a method for creating a multi-frequency carrier signal which is substantially orthogonal to other multi-frequency carrier signals in a phase domain in accordance with a preferred embodiment of the invention.

FIG. 8 illustrates a method for creating a multi-frequency carrier signal which is substantially orthogonal to other multi-frequency carrier signals in a phase domain in accordance with a preferred embodiment of the invention. The N carrier phase domain multiplexed transmitter described in reference to FIG. 6 is suitable for performing this method. In step 400, a suitable processing element identifies an orthogonal vector in a vector space. The orthogonal vector comprises N elements with each element specifying a particular phase shift. In step 405, N carrier signals arranged at substantially periodic intervals in a frequency domain are generated. In step 410, each of the N carrier signals is phase shifted by an amount equal to a corresponding element of the orthogonal vector selected in step 400. In step 420, the N phase shifted carrier signals are summed.

Figure 9:
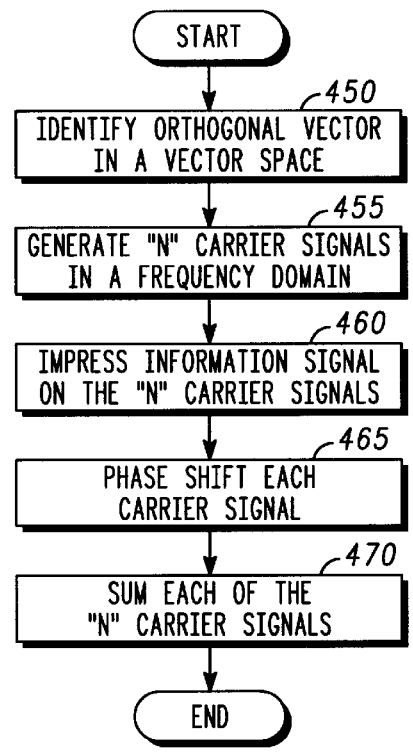
FIG. 9 illustrates a method for creating a multi-frequency communication signal which is substantially orthogonal to other multi-frequency communication signals in a phase domain in accordance with a preferred embodiment of the invention.

FIG. 9 illustrates a method for creating a multi-frequency communication signal which is substantially orthogonal to other multi-frequency communication signals in a phase domain in accordance with a preferred embodiment of the invention. In step 450, an orthogonal vector in a vector space is identified by a suitable processing element. The selected orthogonal vector comprises N elements with each element specifying a particular phase shift. In step 455, N carrier signals, arranged at substantially periodic intervals in a frequency domain, are generated. In step 460, an information signal is impressed on each of the N carrier signals to create information bearing carrier signals. In step 465, each of the N carrier signals is phase shifted by an amount equal to a corresponding element of the orthogonal vector selected in step 450. In step 470, the N phase shifted carrier signals are summed.

Figure 10:
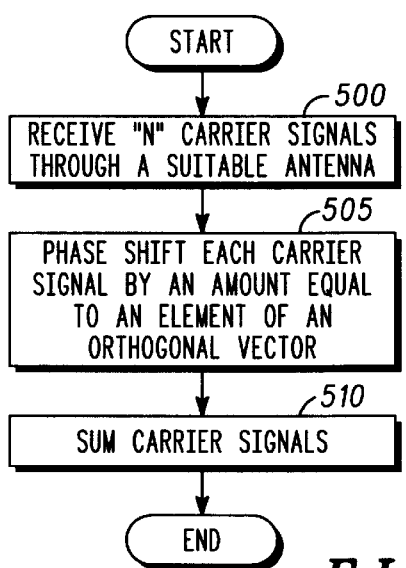
FIG. 10 illustrates a method for demodulating a multi-frequency communication signal which is substantially orthogonal to other multi-frequency communication signals in a phase domain in accordance with a preferred embodiment of the invention.

FIG. 10 illustrates a method for demodulating a multi-frequency communication signal which is substantially orthogonal to other multi-frequency communication signals in a phase domain in accordance with a preferred embodiment of the invention. In step 500, N carrier signals arranged at substantially periodic intervals in a frequency domain are received by a suitable antenna. In step 505, each of the N carrier signals is phase shifted by an amount substantially equal to a corresponding element of the orthogonal vector. In step 510, the N phase shifted carrier signals are summed.

In summary, a method and apparatus for a phase domain multiplexed communication system allows multiple subscriber units to share a common frequency resource without requiring strict timing between the transmitting and receiving station. A communications device which communicates using a plurality of phase domain multiplexed communication signals provides many of the advantages of a code division multiplexed system but does not require complex and elaborate hardware as that of a code division multiplexed communication system.

The foregoing description of the specific embodiments will so fully reveal the general nature of the invention that others can, by applying current knowledge, readily modify and/or adapt for various applications such specific embodiment without departing from the generic concept, and therefore such adaptations and modifications should and are intended to be comprehended within the meaning and range of equivalents of the disclosed embodiments.

It is to be understood that the phraseology or terminology employed herein is for the purpose of description and not limitation. Accordingly, the invention is intended to embrace all such alternatives, modifications, equivalents and variations as fall within the true spirit and broad scope of the appended claims.

What is claimed is:

1. In a communication system, a method for creating a multi-frequency communication signal which is substantially orthogonal to other multi-frequency communication signals in a phase domain, said method comprising the steps of:

identifying an orthogonal vector in a vector space, wherein said orthogonal vector comprises N elements and wherein N is an interger greater than 1 and each of said N elements specifies a phase shift;

generating N carrier signals arranged at substantially periodic intervals in a frequency domain;

phase shifting each of said N carrier signals by an amount equal to a corresponding element of said orthogonal vector to form N phase shifted carrier signals;

impressing an information signal on each of said N phase shifted carrier signals; and summing said N phase shifted carrier signals.

2. The method of claim 1, wherein N is equal to the number of communications devices which can simultaneously use said communication system.

3. The method of claim 2, wherein said identifying step comprises the step of identifying a second orthogonal vector in said vector space for use by a second communications device.

4. The method of claim 1, wherein said phase shifting step comprises the step of progressively shifting each of said N carrier signals by a constant amount.

5. The method of claim 1, wherein the method additionally comprises the step of filtering said information signal.

6. The method of claim 5, wherein said filtering step comprises applying a root raised cosine filter.

7. The method of claim 1, wherein said impressing step comprises the step of impressing digital information on each of said N carrier signals.

8. The method of claim 1, wherein said impressing step comprises the step of impressing analog information on each of said N carrier signals.

9. The method of claim 1, wherein said summing step comprises the step of summing voltages of said N phase shifted carrier signals.

* * * * *